Nov. 5, 1968 W. H. LOCKWOOD 3,409,163
EGG AND MILK CRATE CONSTRUCTION
Filed Nov. 13, 1967 6 Sheets-Sheet 1
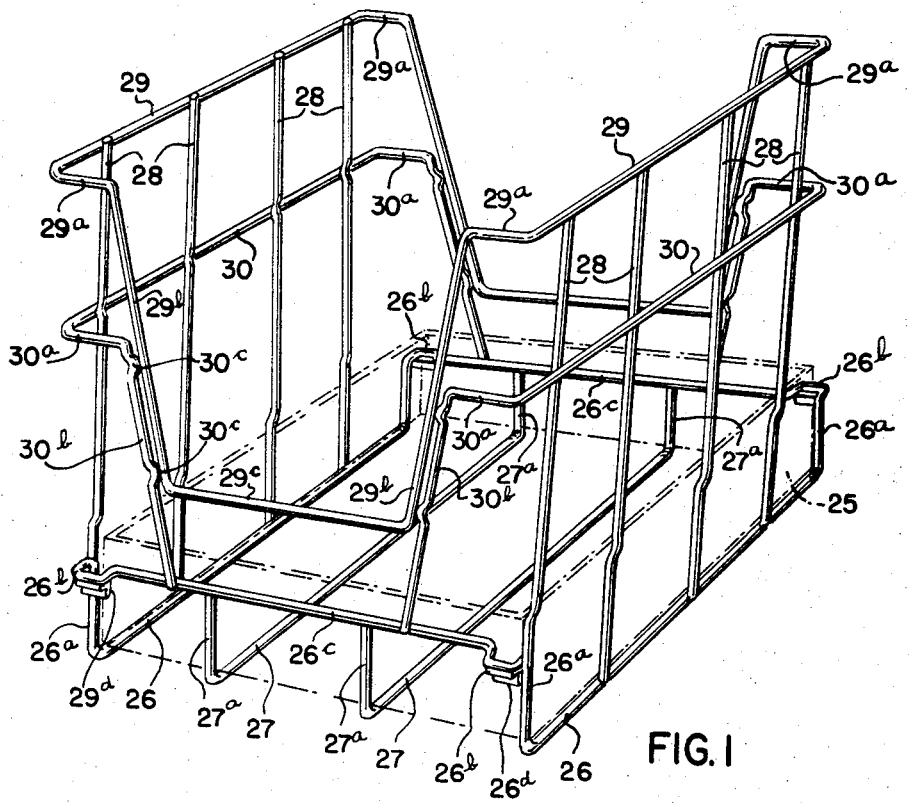
FIG. 1
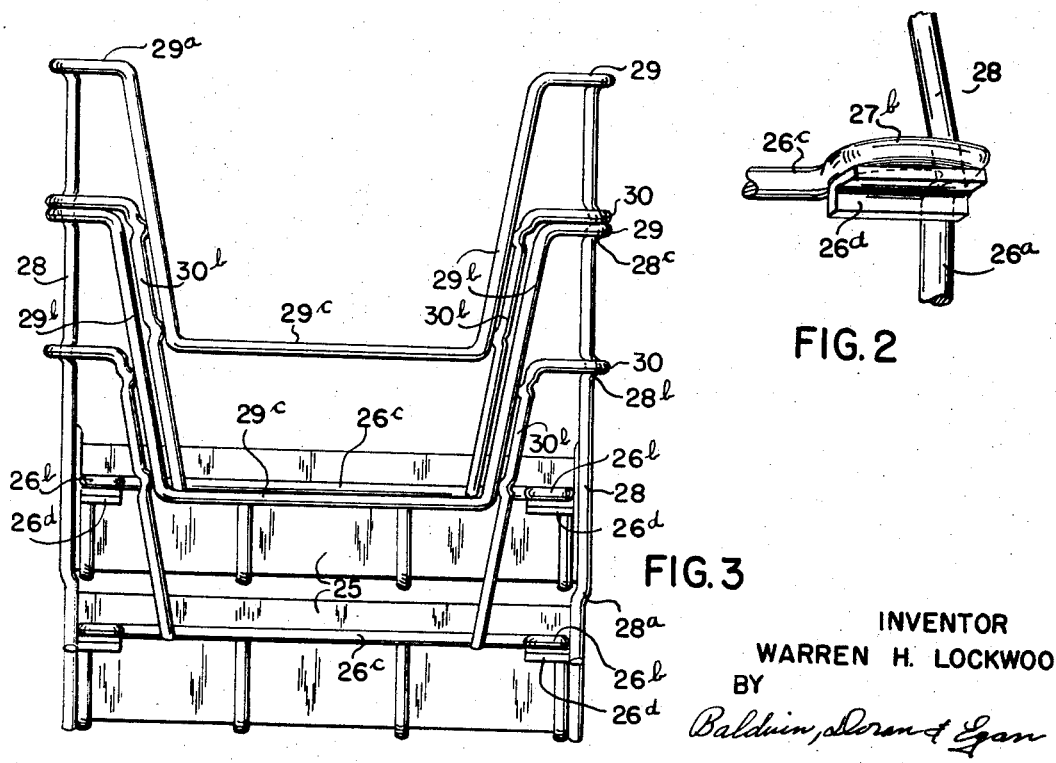
FIG. 2
FIG. 3
INVENTOR
WARREN H. LOCKWOOD
BY
Baldwin, Doran & Egan
ATTORNEYS Nov. 5, 1968 W. H. LOCKWOOD 3,409,163
EGG AND MILK CRATE CONSTRUCTION
Filed Nov. 13, 1967 6 Sheets-Sheet 2

INVENTOR
WARREN H. LOCKWOOD
BY
ATTORNEYS

Nov. 5, 1968  W. H. LOCKWOOD  3,409,163
EGG AND MILK CRATE CONSTRUCTION
Filed Nov. 13, 1967  6 Sheets-Sheet 6
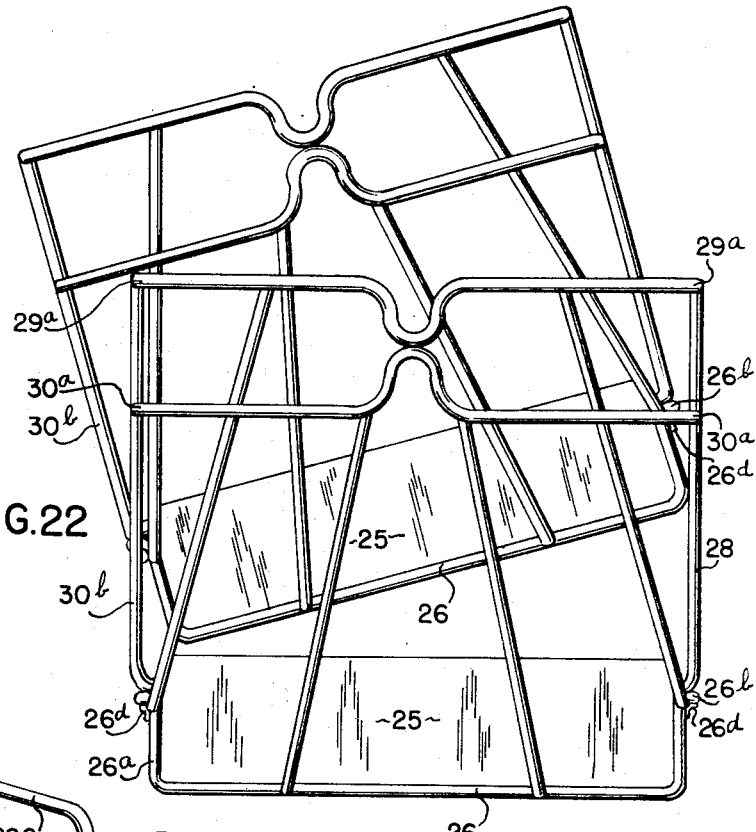
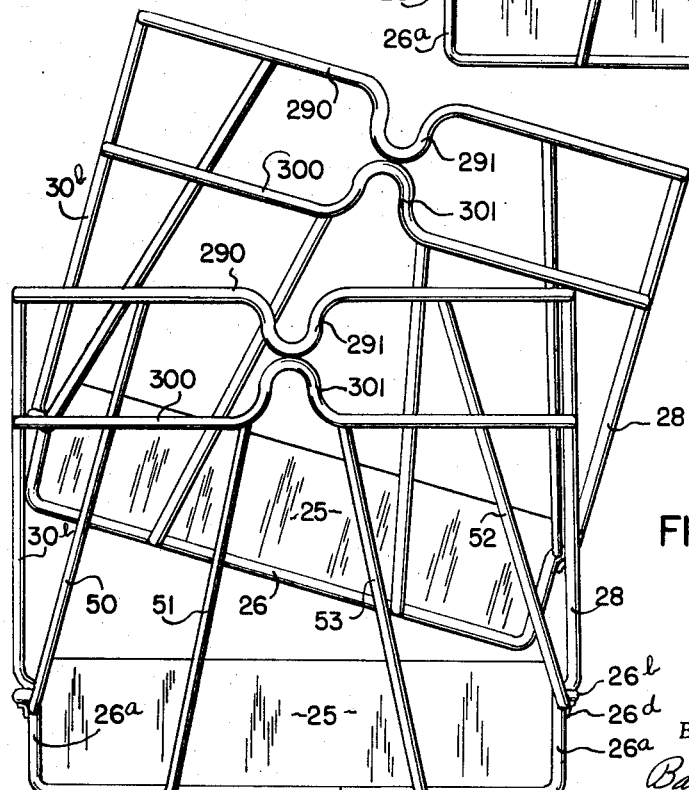
INVENTOR.
WARREN H. LOCKWOOD
BY
Baldwin, Doran & Egan
ATTORNEYS

United States Patent Office 3,409,163
Patented Nov. 5, 1968

3,409,163
EGG AND MILK CRATE CONSTRUCTION
Warren H. Lockwood, 1329 Granvia Altamira,
Palos Verdes Estates, Calif. 90274
Filed Nov. 13, 1967, Ser. No. 682,157
18 Claims. (Cl. 220—19)

ABSTRACT OF THE DISCLOSURE

A crate for the handling of egg and milk cartons and the like and adapted to stack and nest without the use of moving parts has a generally rectangular bottom with rigidly attached side walls and end walls upstanding therefrom. The walls have a height at least about equal to a dimension across the bottom. At least one end wall has a central through opening or recess open at the top and having lateral sides downwardly converging to a zone about one-half to two-thirds of the crate height. Each of the side walls has a plurality of parallel wires extending in the plane of the wall from top to bottom to permit nesting of two like receptacles. These wires are so inclined and so spaced that an upper receptacle may be tested in a lower like receptacle by tilting the upper part of the upper receptacle outwardly through said end wall opening of the lower receptacle sufficiently to permit the bottom of said other end wall of the upper receptacle to clear the other end wall of the lower receptacle down to a nested position. During the tilting operation, the side wall wires of both receptacles lie in a common plane. Extending endwise from the bottom are projections acting as lower stacking supports when an upper crate is stacked on a lower like crate by placing such stacking supports on the upper edge of a lower crate; or, alternatively, on intermediate stacking points or supports provided by a reinforcing wire parallel to and below the top. The angles of tilt of an upper crate is such that its lower stacking supports will clear the upper edges and also any intermediate upper stacking points of the lower crate, whereupon the upper crate will nest down into a lower crate with the side wall wires and the lateral sides of their end openings lying parallel to like elements and vertically related thereto. The two end walls may have similar openings or one end wall may be closed.

This invention relates to improvements in nesting and stacking crates for the handling of egg cartons, milk cartons and the like. It is characteristic of containers for this purpose that they are deeper than many containers for handling other articles and usually the height of the crate is at least equal to a dimension across the bottom. There is a problem in nesting crates of this deep character, especially when no moving parts are used, and the present invention discloses a novel structure for nesting such containers.

This invention tilts an upper container through an upwardly opening recess in the end wall of a lower container to provide the nesting action.

Other problems relate to providing a structure sufficiently open at at least one end to permit tilting of an upper container when nesting into a lower container and at the same time retaining the structural strength of the container.

Other objects and advantages of this invention will be set forth in the accompanying specification as applied to the drawings, and the essential features of the invention will be set forth in the appended claims.

In the drawings:

FIG. 1 is a perspective view of a first embodiment of the crate of this invention;

FIG. 2 is a detailed perspective view, enlarged, at the lower front right-hand corner of FIG. 1;

FIG. 3 is a front elevational view of two of the containers of FIG. 1 in nested relationship;

Figure 13:
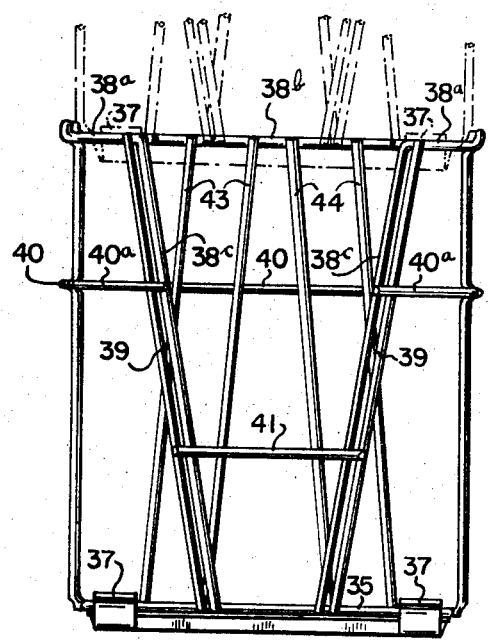
Figure 14:
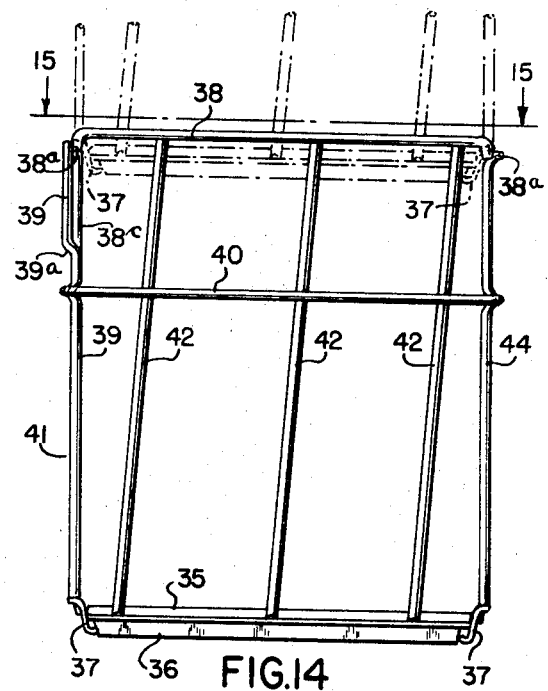

FIGS. 13 through 18 show a third embodiment of the invention wherein the opening in the end wall for tilting of the upper receptacle, when nesting, is provided in one end wall only while the other end wall contains sufficient wire to close it; FIG. 13 showing a front elevational view in full lines of one container with a dot-dash showing of a portion of a second container in stacked position thereupon;

FIG. 14 is a side elevational view of the containers of FIG. 13.

Figure 15:
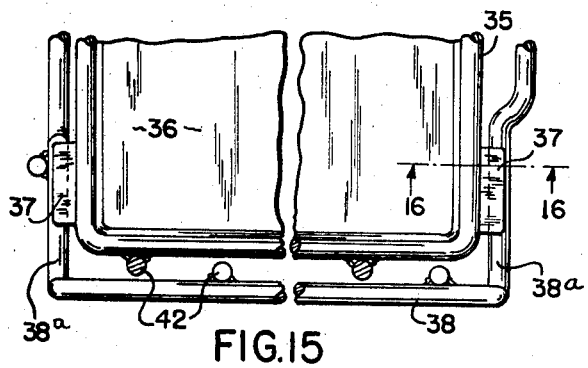
Figure 16:
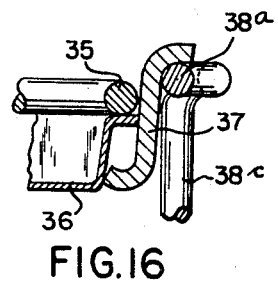
Figure 17:
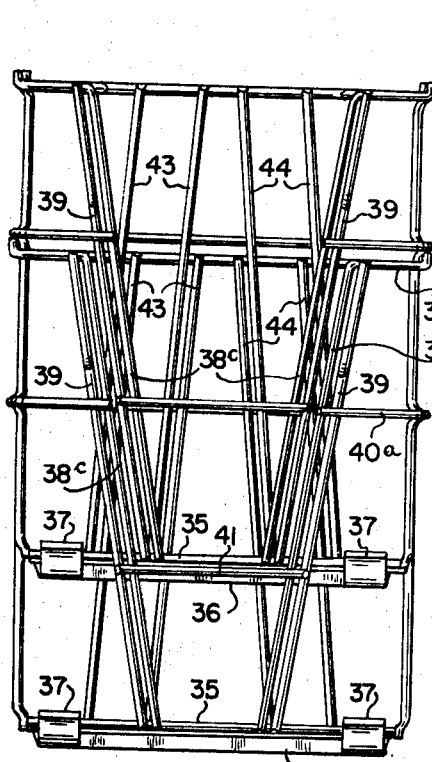
Figure 18:
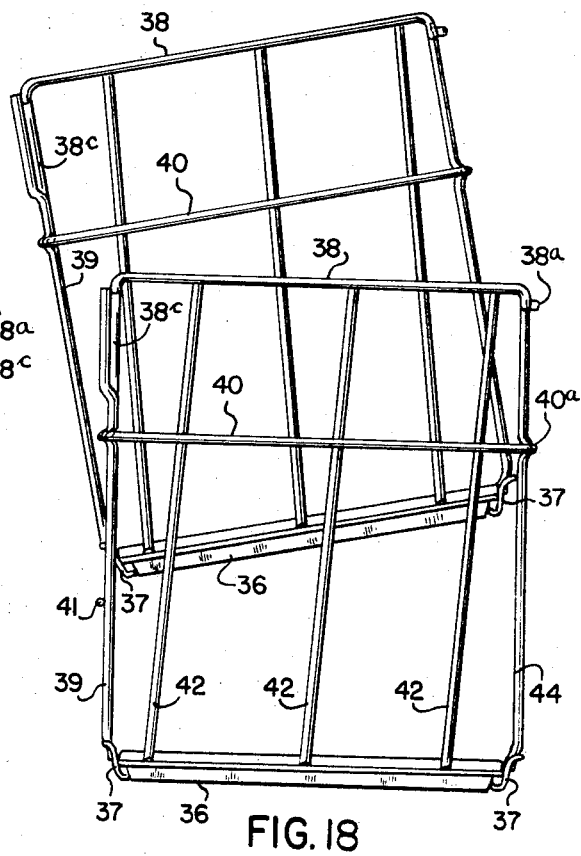
Figure 19:
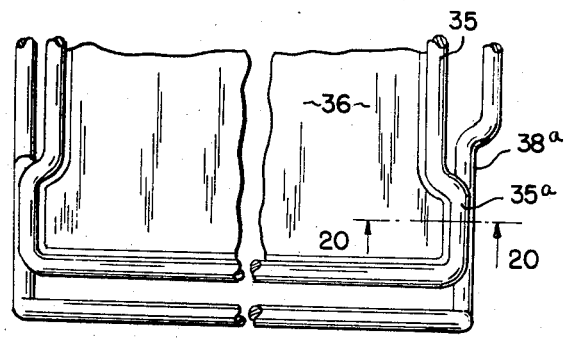
Figure 20:
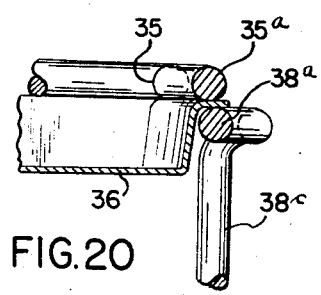

FIG. 15 is a sectional view taken along the line 15—15 of FIG. 14;

FIG. 16 is an enlarged fragmental sectional view taken along the line 16—16 of FIG. 15;

FIG. 17 is an end elevational view of two of the containers of FIG. 13 shown in nested position;

FIG. 18 is a side elevational view of two containers of the type shown in FIGS. 13 and 17, but indicating an intermediate position of the upper container as it moves downwardly toward nesting position in the lower container;

FIG. 19 is a view similar to FIG. 15 but showing a modified form of the lower support points for tiering a receptacle;

FIG. 20 is a fragmental sectional view taken along the line 20—20 of FIG. 19; while FIGS. 21 and 22 are side elevational views of a fourth embodiment of the invention wherein openings are provided in end walls like those shown in FIGS. 1 and 3 and the wires in the side walls are so arranged that the upper receptacle may be tilted out either of the end walls in moving down to a nested position in the lower receptacle.

For simplicity of description, the elements forming the structure of the crates of this invention will be referred to as "wires," but it should be understood that similar constructions may be formed of synthetic plastic materials to provide crates conforming to the teachings of this invention.

The crate of this invention is intended for the handling of egg or milk cartons of the like and, therefore, the walls usually have a height at least about equal to a dimension across the bottom. A first embodiment of this invention is shown in FIGS. 1 through 6. The crate has a generally rectangular bottom which could be sufficiently closed by a wire or metal structure to hold the articles to be carried, but, in this case, there is shown in broken lines a rectangular pan 25 adapted to rest upon a skeleton bottom formed of two side walls 26 and two parallel intermediate wires 27. The side walls 26 may be one part of a continuous wire bent upward at opposite ends 26a, then outwardly in a projecting loop 26b near each side wall, to provide a tiering support, and then horizontally across each end at 26c. As best seen in FIG. 2, each of the projections 26b may have welded to its under side an angular tiering seat 26d. Each of the intermediate walls 27 is turned upwardly at opposite ends as indicated at 27a and these are welded at their upper ends to the horizontal cross wire 26c.

In this embodiment of the invention, each side wall comprises a plurality of inclined parallel wires 28, the inclination of these wires being upwardly and away from the nearer end of the crate as seen in FIG. 1 for a purpose later described. Each of these side wall wires is rigidly secured, as by welding, to the bottom wall 26 and 26a and to an upper edge wire 29 at the top. This upper edge wire has a main portion parallel to the portion 26 of the bottom wire and at which end the top wire turns horizontally inwardly as at 29a and then downwardly and inclined inwardly on wire portions 29b which are connected across the bottom by another wire portion 29c. These wire portions 29b and 29c define a through opening in this case through each of the end walls and through which an upper like receptacle may be tilted in a nesting operation to be later described. The upper edge portions 29a provide upper tiering support points to cooperate with the tiering seats 29d which are vertically directly below them so that two like receptacles may be stacked vertically in line. This, of course, would be true in either of 180° orientation of the two like receptacles.

A reinforcing wire 30 is provided spaced from and parellel to the top wire 29 and, in this case, slightly more than one-fourth of the total height of the crate downwardly from the top. The wire 30 is bent horizontally inwardly at each end as indicated at 30a, thus providing intermediate tiering support points which may cooperate alternatively with the lower tiering support members 29d if the crates are to be stacked at less than their full height. The wires 30a then are inclined downwardly and laterally inwardly at 30b generally parallel to the wire portions 29b previously described. The wire portions 30b and 29b are rigidly secured to each other as by welding the dimples 30c to the wire portions 29b. This gives a parallel wire beam construction along the sides of the through openings in the end walls which strengthens the openings against lateral separation. The wire portions 30b extend downwardly to a horizontal bottom wire 26c where they are rigidly secured by welding. Thus the parts 29c, 26c and 30b form another strong construction across the end wall. Preferably the wires 30 are welded to the side wall wires 28 at their crossing points.

Referring to FIG. 3, it will be noted that each side wall wire 28 is bent slightly outwardly at 28a just above the top of the bottom pan 25. Also dimples 28b are provided where the side wall wires are welded to the reinforcing wire 30 and other dimples 28c are provided in the wires 28b where they are welded to the top wire 29.

In FIG. 3, two crates like FIG. 1 are shown in fully nested position with the reinforcing wires 30 of the upper crate resting against the upper edge wires 29 of the lower crate and with the wire portions 30b of the upper crate nesting against the end opening defining wires 29b of the lower crate.

Figure 4:
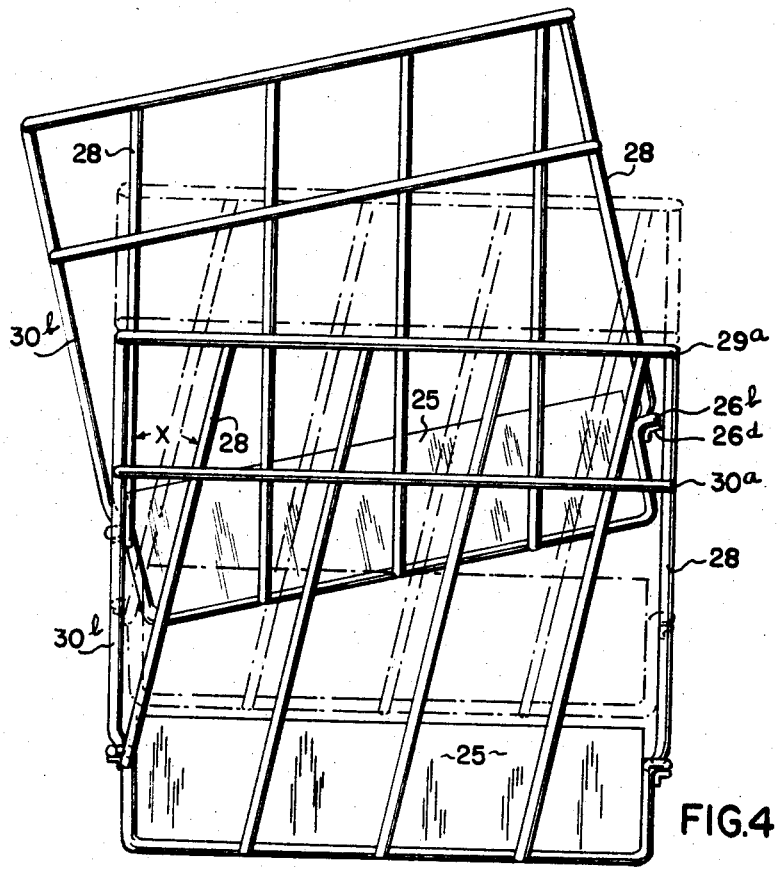
FIG. 4 is a side elevational view of two of the containers of FIG. 1 illustrating the manipulation of nesting one crate into the other crate.

FIG. 4 shows the manipulation necessary to get an upper receptacle nested into a lower receptacle. Here the upper receptacle is shown in full lines with its upper portion tilted out through the end opening of the lower receptacle at the lefthand side of FIG. 4. This tilting is sufficient to permit the lower tiering support portions 26b and 26d at the right-hand side of FIG. 4 to pass downwardly past the upper tiering support portions 29a of the lower receptacle or of the intermediate tiering support portions 30a of the lower crate. It will be noted that there are clearways vertically beneath the upper tiering support portions 29a down to the final nested position of an upper receptacle in a like lower receptacle, interrupted only by the intermediate tiering support portions 30a. Therefore, once the lower tiering support portions 26b and 26d, seen at the right in FIG. 4, have cleared the upper tiering support portions 29a and the intermediate tiering support portions 30a, the upper receptacle may be returned to a vertical condition and moved down to a final nested position shown in dot-dash lines in FIG. 4. It will be noted that the angle X in FIG. 4 shows that the left-hand side wall wire 28 of the upper receptacle is tilted approximately 15° in a counterclockwise direction from the left-hand wire 28 in the side wall of the lower receptacle. In this form of the invention, this is sufficient tilting to clear the tiering support points at the opposite side of he crate as above described.

Figure 5:
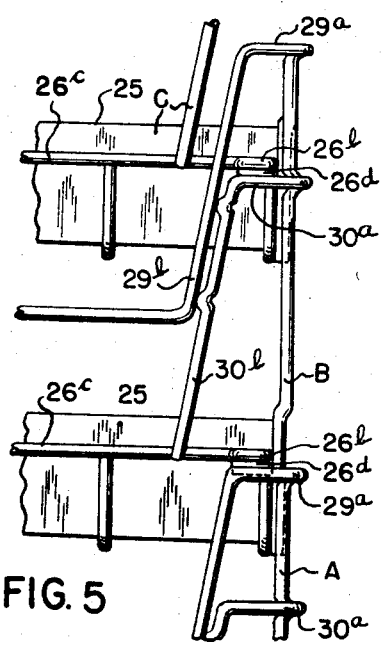
FIG. 5 is a fragmental end elevational view of a plurality of the containers of FIG. 1 showing different stacking relationships which are possible.

FIG. 5 shows a fragment of the upper portion of a lowermost crate A supporting at 29a the lower tiering support portions 26d of an intermediate crate B which, in turn, is shown supporting at the intermediate tiering support points 30a the lower tiering support seats 26d of a fragment of an uppermost crate C.

Figure 6:
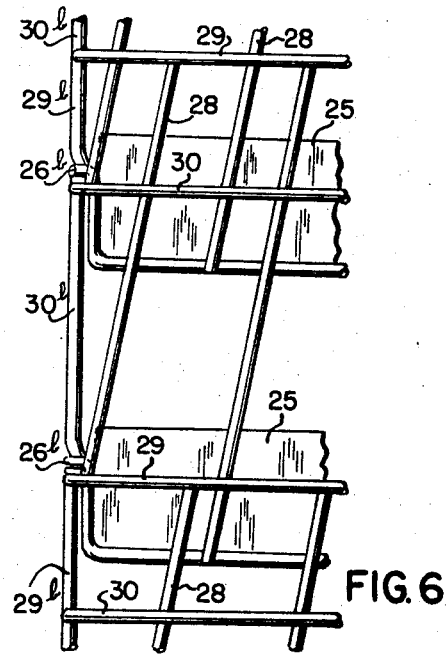
FIG. 6 is a fragmental side elevation of two containers stacked as shown in FIG. 5.

FIG. 6 is a side elevational view of the same receptacles.

Whereas the first embodiment is designed to handle milk cartons, the second embodiment, shown in FIGS. 7 through 12, is designated to handle cartons of eggs. Since much of the second embodiment is almost exactly like the first and the elements perform the same functions, all of such parts have been given the same reference characters as in FIG. 1 with a prime suffix. The points where the second embodiment differ from the first embodiment will now be explained.

Figure 12:
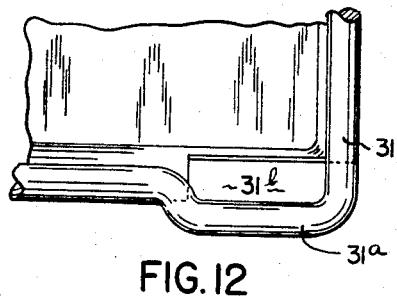
FIG. 12 is an enlarged fragmental sectional view taken from the position of the line 12—12 of FIG. 7.

The bottom wire 31 is a single continuous wire around the entire rectangular bottom with tiering support projections 31a near the four corners. As best seen in FIG. 12, an opening 32 is provided at each of the projecting loops 31a to receive a stacking support projection 32 seen at the top of the crate in FIGS. 7 through 10 and indicated in top plan view in FIG. 11 which is an enlargement. Each projection 32 is rigidly welded to a top edge member 29a'. When two crates are stacked one on top of the other as shown in dot-dash lines in FIG. 7, the projections 32 on the lower crate extend upwardly into the openings 31b of the upper crate. This interengagement holds the two crates firmly in stacked position.

Figure 7:
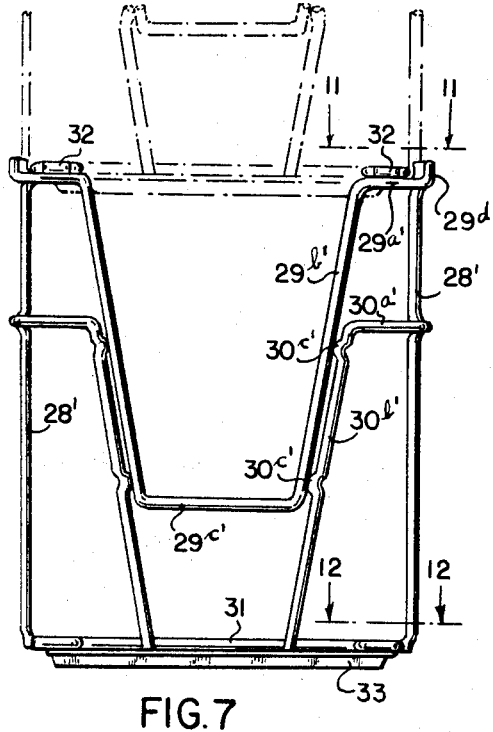
FIG. 7 is a front elevational view of a second embodiment of this invention with a portion of a second container in dot-dash lines in stacked position.
Figure 8:
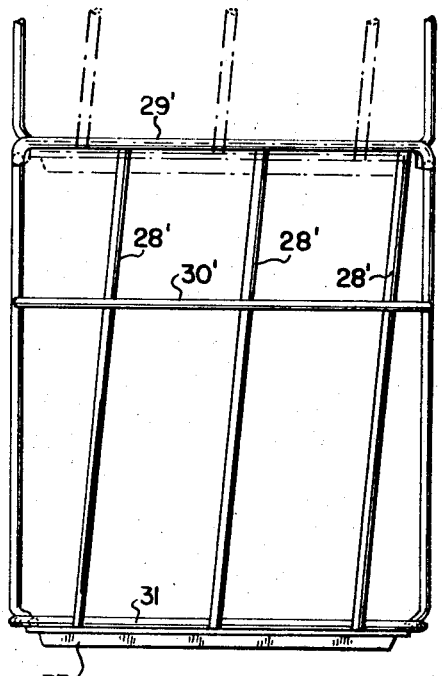
FIG. 8 is a side elevational view of the containers of FIG. 7.

A slight difference in the upper edge wire 29' will also be noted, namely, the portion of the wire running along the side walls is slightly higher than the portions 29a' along the end walls because of a slight rise at 29d and it will be noted in FIG. 7 these portions 29d of the lower receptacle lie closely alongside the bottom of the upper receptacle also aiding in a firm tiering or stacking action.

The bottom pan in the second embodiment is shown as a rather shallow pan 33 which is welded to the lower side of the bottom wire 31.

The operation of the second embodiment should now be easily understood. In stacking two crates, the upper crate is set on the lower one with the opening 31b embracing the upper projections 32 of the lower crate. This can be done with orientation of the two crates in either of two positions 180° apart. In other words, the upper receptacle can be tiered in one position and then rotated 180° and tiered in the other position.

Figure 9:
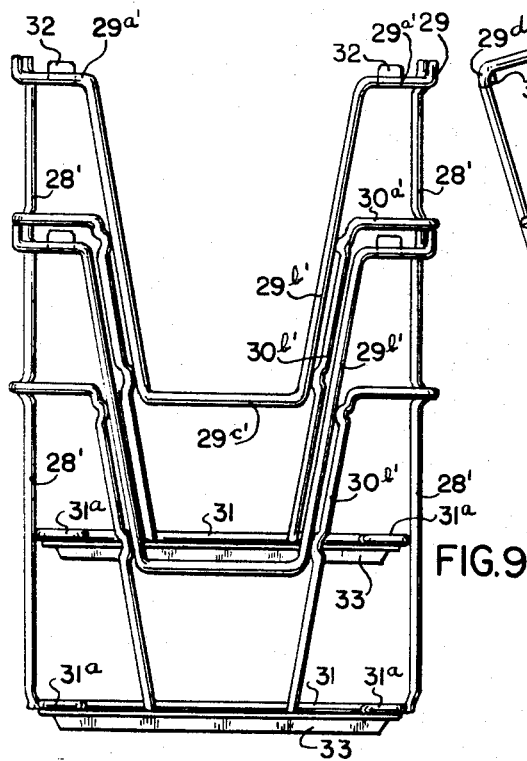
FIG. 9 is an end elevational view of two containers like that shown in FIG. 7 but in nested position.
Figure 10:
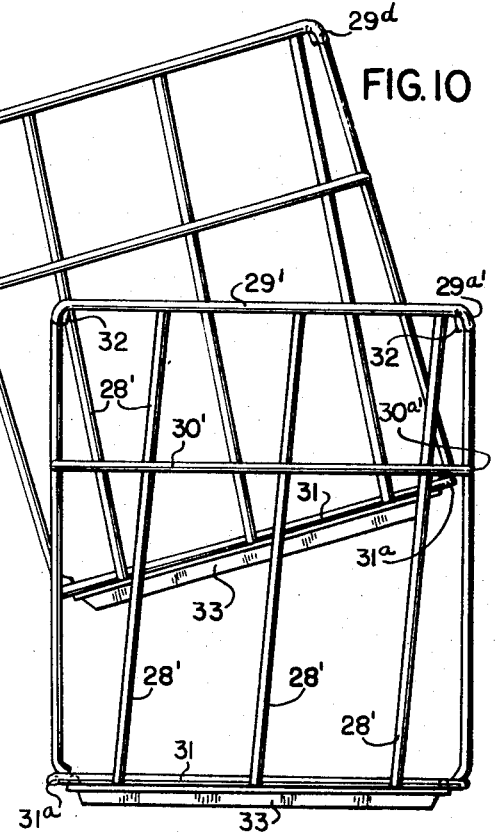
FIG. 10 is a side elevational view of two containers like that shown in FIG. 7, but showing an intermediate position of the upper receptacle as it moves from a stacked position to a nesting position.
Figure 11:
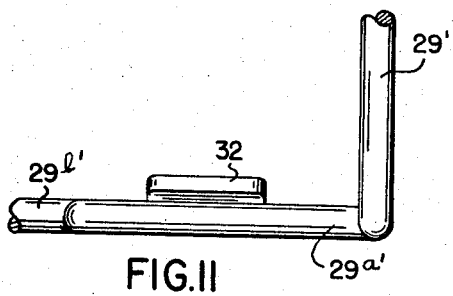
FIG. 11 is an enlarged fragmental sectional view taken from the position of the line 11—11 of FIG. 7.

In moving the upper crate down to the lower crate for nesting, the upper receptacle is tilted through one of the openings in the end wall of the lower receptacle bounded by the wire portions 29b' and 29c'. In this embodiment, the arrangement of the side wall wires 28' permits tilting only in the direction shown in FIG. 10. This tilting is sufficient to permit the lower tiering support loops 31a of the upper receptacle, after being lifted off the projections 32 of the lower receptacle, to pass by the members 29a' and 30a' of the lower receptacle, after which the upper receptacle in FIG. 10 can move down into a nested position in the lower receptacle. This nested position is shown in FIG. 9.

The third embodiment of this invention is shown in FIGS. 13 through 18. One difference between this embodiment over the two previously described is that there is provided a through opening through one end wall only of the crate with closing wires at the opposite or back end of the crate so as to make the crate much stronger and giving the operator a more logical place to grasp the crate to nest or un-nest it. Referring now to the various views, a bottom wire 35 extends entirely around the four sides of the rectangular bottom and has welded on its under side as clearly seen in FIG. 16 a shallow pan 36. This same view shows lower tiering support members 37 welded to wire 35 and pan 36 in the position shown in FIG. 16. These are of generally S-shape and adapted to support two crates in stacked or tiered position as will be presently described. These support members are near the four corners of the bottom. An upper edge wire 38 has parallel portions extending along the side walls and then drops down to a slightly lower level providing at the front end wall two upper tiering support portions 38a, and extends at the same level across the back wall as indicated 38b. At the front wall, the upper edge wire extends for a short distance horizontally inwardly at the top as already indicated and then is inclined downwardly and inwardly as seen at 38c. These wire portions extend clear to the bottom and are rigidly welded to the bottom wire 35. Two wires 39 are provided parallel to the wire portions 38c and these are bent slightly inwardly at 39a a short ways down from the top as clearly seen in FIG. 14 to accommodate a reinforcing wire 40 which performs much the same function of the reinforcing wires 30 and 30' previously described. These reinforcing wires are welded rigidly to the wires 38c and 39 and a tie member 41 is provided approximately half way between the wire 40 and the bottom wire 35. This wire also is welded to wires 38c and 39 so that these latter parallel wires are rigidly tied together at the top and at the bottom and two intermediate points, thus providing a beam effect which greatly strengthens the front end wall. The side walls each comprise a plurality of parallel wires 42 inclined upwardly and away from the front wall, that is, the wall which has the through opening. The wires 42 are rigidly welded to the wires 35, 38 and 40.

The back wall, as clearly seen in FIGS. 13 and 17, has two parallel wires 43 which slope upwardly and toward the center and two other parallel wires 44 which slope upwardly and toward the center in the opposite direction to wires 43. All of these wires are rigidly welded to bottom wire 35, to upper edge wire portion 38b and to reinforcing wire 40.

In the operation of this third embodiment, two like crates can be stacked one on top of the other in vertical alignment as clearly seen in FIG. 13 where the upper crate, shown in dot-dash lines, has its lower tiering supports 37 engaged with the upper tiering supports 38a of the lower crate. In FIG. 17, two like crates are shown in fully nested position. In this position, the wires 39 of an upper crate lie parallel to the wires 38c of a lower crate. The wires 40, 41, 42, 43 and 44 of the two crates are closely parallel to those of the nested crate.

In FIG. 18, there is illustrated the movement of the upper crate down into the lower crate for nesting. Here again, the upper crate is tilted out the through opening of the front end of the lower crate sufficiently so that the lower tiering support portions 37 on the opposite or back side of the upper crate will clear the upper tiering support portions 38a or the intermediate tiering support portions 40a, after which, from the position of FIG. 18, the upper crate may be returned to a vertical position and there is a clearway for each support portion 37 down to the nested position of FIG. 17.

FIGS. 19 and 20 are taken from the same position as FIGS. 15 and 16 respectively and are intended to show a modification of the lower tiering support portions which could be incorporated in the third embodiment. Here the bottom wire 35 is provided with four loops 35a near the four corners of the bottom adapted to rest on the upper tiering support portion 38a when stacking two like crates.

All of the embodiments of this invention described heretofore can stack two like crates in either of two positions oriented 180° from each other, but they can nest in only one direction because of the arrangement of the side wall wires. In FIGS. 21 and 22, there is shown a fourth embodiment which can be tiered and nested in either of two positions oriented 180° apart. The front and rear wall construction of these two crates is not shown because they are identical with that shown and described in FIG. 1 and the parts have been given identical reference characters. The difference is in the side walls. The upper edge wire 290 along each side wall is provided with a centrally located down turned loop 291 which is rigidly welded to the reinforcing wire 300 which has an upwardly turned loop 301 for cooperation with loop 291. This structure gives a strong beam support to each of the side walls. Two side wall wires 50 and 51 are inclined upwardly and away from one end wall while two similarly located wires 52 and 53 slope upwardly and away from the other end wall. The wires 50 and 52 are welded to wires 26a, 290 and 300. The wires 51 and 53 are welded to wires 26 and 300. It will be noted that the wires 50 and 51 are symmetrical respectively with the wires 52 and 53 relative to the center line of the receptacle so that these wires will permit nesting of two crates relative to each other no matter if one receptacle is turned 180° relative to the position shown.

The crates of FIGS. 21 and 22 may be tiered exactly like those described in connection with FIGS. 1 through 6, namely, with the lower tiering support seats 26d of the upper receptacle resting on the upper tiering support portions 29a of the lower crate in either of two positions 180° apart. As viewed in FIG. 21 the two crates may be moved toward nested position by tilting the upper crate out the end wall through opening on the right-hand side of FIG. 21 whereas FIG. 22 shows that the same nesting operation may be performed tilting the upper crate out the left-hand end of the lower receptacle. In each case, the amount of tilting is sufficient to permit the lower support portions 26b and 26d of the upper crate to clear the upper tiering support portions 29a or the intermediate tiering support portions 30a of the lower receptacle, after which there are clearways permitting the upper receptacle to move down to a nested position in the lower crate.

What is claimed is:

1. A crate for the handling of egg or milk cartons or the like and adapted to stack and nest with like crates without the use of moving parts, said crate comprising a generally rectangular bottom having rigidly connected thereto two generally parallel end walls and two generally parallel side walls also rigidly connected to said end walls, said side walls having a height from top to bottom at least about equal to a dimension across said bottom, each of said side walls comprising parallel wires extending from top to bottom of said crate rigidly secured in said walls at top and bottom, at least one of said end walls having an upwardly opening recess of less width than the distance between the side walls and extending downwardly for about for about one-half to about two-thirds of the height of the crate, said recess defined on its lateral sides by wires diverging upwardly and outwardly in the plane of said one end wall, there being lower stacking support points near the bottom of said end walls projecting endwise therefrom, there being upper stacking support points adjacent the top of said end walls and vertically directly above said lower stacking support points, whereby two like crates may be stacked vertically in line with the lower support points of an upper crate engaging the upper support points of a lower crate, nesting of two like crates being made possible by the angle of inclination and spacing of said side wall wires being arranged to permit tilting of the upper part of an upper crate through said one end recess of a lower like crate at an angle where the lower support points of the upper crate may move downwardly past the upper support points of the lower crate while said side wall wires of the two crates lie in a common plane, and there being clearways in each end wall from immediately beneath each upper support point down to the nesting position in a lower crate of said lower support points of an upper crate permitting nesting of two like crates vertically in line with said wires of said side and end walls nesting vertically in line with like wires of an adjacent crate.

2. A crate as defined in claim 1 including intermediate stacking support points on said end walls between said upper and lower support points and vertically aligned therewith, and said clearways being interrupted substantially only by said intermediate support points, whereby two like crates may be stacked vertically in line with the lower support points of an upper crate engaging the intermediate support points of a lower like crate, and the upper part of the upper crate may be tilted through said one end recess of the lower crate at an angle where the lower support points of the upper crate may move downwardly past the intermediate support points of the lower crate and thence through said clearways down to a nesting position.

3. A crate as defined in claim 1 wherein said other end is provided with a recess like and directly opposite said recess in said one end.

4. A crate as defined in claim 1 wherein said other end is provided with closure members directly opposite said recess in said one end.

5. A crate as defined in claim 1 wherein said lower stacking support points comprise brackets rigid with said bottom and having upper hook-shape portions opening endwise and adapted to engage upper stacking support points of a like crate.

6. A crate as defined in claim 1 wherein said lower stacking support points comprise open loops.

7. A crate as defined in claim 6 wherein said bottom has a single wire about its periphery, and said loops are formed in said wire.

8. A crate as defined in claim 6 wherein said upper stacking support points comprise upstanding tongues so sized and positioned that they enter into said loops when two like crates are stacked.

9. A crate as defined in claim 1 wherein said side walls have top edge defining members extending higher than said upper stacking support points, whereby said top edge defining members prevent lateral displacement of a like crate resting upon said upper stacking support points.

10. A crate as defined in claim 1 wherein said recess is defined on each of its two lateral sides by two parallel wires diverging upwardly and outwardly in the plane of said one end, and means rigidly securing said two wires for at least one-third of their parallel length to act as a beam there.

11. A crate as defined in claim 1 wherein a unitary wire defines the upper edges of said side walls and extends laterally inwardly along said end walls, and at said one end wall extends downwardly to provide said wires defining the lateral sides of said one end recess and a cross wire connecting the lower ends of said lateral sides, said side wall wires rigidly secured to said upper edge defining wire.

12. A crate as defined in claim 11 including a reinforcing wire parallel to said bottom and to said upper edges, said reinforcing wire extending along said side walls and rigidly secured to said side wall wires, said reinforcing wire extending along said end walls sufficiently to provide intermediate stacking support points intermediate said upper and lower support points, and at said one end said reinforcing wire being rigidly secured to said wires defining the lateral sides of said one end recess.

13. A crate as defined in claim 11 including a reinforcing wire parallel to and below said wire defining the upper edges of said side walls, said reinforcing wire nearer to said upper edges than to said bottom, said reinforcing wire at said one end extending inwardly along said wall of said one end to engagement with, and there rigidly secured to, said wires defining the lateral sides of said one end recess.

14. A crate as defined in claim 13, wherein said reinforcing wire extends from said points of engagement with said wires defining the lateral sides of said one end recess parallel to said last named wires and rigidly secured thereto, and then extends to said bottom to which it is rigidly secured.

15. A crate as defined in claim 1, including a top unitary wire extending along the side walls of said crate and rigidly secured to the upper ends of said side wall wires, said unitary wire extending along said end walls and at said one end wall extending horizontally inwardly from each side wall then downwardly and inwardly in the plane of said one end wall providing said wires defining the lateral sides of said one end recess and then horizontally across said one end wall connecting said lateral side defining wires at a zone between about one-quarter to one-half the height of said crate above said bottom, a unitary reinforcing wire parallel to and below said top wire along said side walls and rigidly secured to said side wall wires, said reinforcing wire nearer to said top wire than to said bottom, said reinforcing wire extending along said end walls and at said one end wall extending horizontally inwardly in the plane of said one end wall to engagement with, and there rigidly secured to, said wires defining the lateral sides of said one end recess, and extending thence downwardly and there rigidly secured to said bottom.

16. A crate as defined in claim 1, including two parallel wires defining the lateral edges of said one end recess, said wires extending from top to bottom of said crate, a top wire defining the upper edge of said crate and rigidly secured to said side wall wires, said two parallel wires rigidly secured to said top wire and to said bottom, and means rigidly securing said two parallel wires to each other between said top wire and said bottom.

17. A crate as defined in claim 1, wherein said side wall wires are all inclined in the same direction and upwardly away from said one end wall at the top.

18. A crate as defined in claim 1, wherein both of said end walls are provided with identical through recesses, and said side wall wires in each side wall comprise two sets equal in number and spacing with each set inclined upwardly and away from its adjacent end wall, whereby two like receptacles may be nested by tilting the upper one outwardly through said through recess in either end wall and at 180 degrees of relative orientation.

References Cited

UNITED STATES PATENTS

| | | | |
|---|---|---|---|
| 2,950,825 | 8/1960 | Averill | 211—126 |
| 3,202,294 | 8/1965 | Rogus | 220—19 XR |
| 3,334,766 | 8/1967 | Rogus. | |

THERON E. CONDON, *Primary Examiner.*

G. E. LOWRANCE, *Assistant Examiner.*